(12) United States Patent
Henderickx

(10) Patent No.: US 11,904,650 B2
(45) Date of Patent: Feb. 20, 2024

(54) SHOCK ABSORBER

(71) Applicant: DRiV Automotive Inc., Lake Forest, IL (US)

(72) Inventor: Jonas Henderickx, Beringen (BE)

(73) Assignee: DRiV Automotive Inc., Lake Forest, IL (US)

( * ) Notice: Subject to any disclaimer, the term of this patent is extended or adjusted under 35 U.S.C. 154(b) by 356 days.

(21) Appl. No.: 17/411,765

(22) Filed: Aug. 25, 2021

(65) Prior Publication Data

US 2023/0065747 A1 Mar. 2, 2023

(51) Int. Cl.
| | |
|---|---|
| B60G 17/08 | (2006.01) |
| B60G 13/08 | (2006.01) |
| F16F 9/18 | (2006.01) |

(52) U.S. Cl.
CPC ............ B60G 17/08 (2013.01); B60G 13/08 (2013.01); *B60G 2202/24* (2013.01); *B60G 2204/62* (2013.01); *B60G 2206/41* (2013.01); *B60G 2500/104* (2013.01); *B60G 2600/21* (2013.01); *B60G 2800/162* (2013.01)

(58) Field of Classification Search
CPC ........ F16F 9/182; F16F 9/5126; B60G 17/08; B60G 13/08; B60G 2202/24; B60G 2204/62; B60G 2206/41; B60G 2500/104; B60G 2600/21; B60G 2800/162; B60G 2500/10; B60G 2500/11
See application file for complete search history.

(56) References Cited

U.S. PATENT DOCUMENTS

| | | | |
|---|---|---|---|
| 3,180,453 | A | 4/1965 | Murata |
| 3,232,390 | A | 2/1966 | Chano |
| 3,379,286 | A | 4/1968 | Takagi |
| 3,570,635 | A | 3/1971 | Takagi |
| 4,765,446 | A | 8/1988 | Murate et al. |

(Continued)

FOREIGN PATENT DOCUMENTS

| | | |
|---|---|---|
| DE | 102004001743 A1 | 8/2004 |
| DE | 102006046333 B3 | 2/2008 |

(Continued)

OTHER PUBLICATIONS

International Search Report Received in Related PCT Application No. PCT/US2019/053652 dated Jan. 16, 2020.

(Continued)

*Primary Examiner* — Robert A. Siconolfi
*Assistant Examiner* — James K Hsiao
(74) *Attorney, Agent, or Firm* — McGarry Bair PC

(57) ABSTRACT

A shock absorber for a vehicle includes a pressure tube containing a hydraulic fluid. The shock absorber further includes a piston rod extending within the pressure tube along a longitudinal axis, and including a piston end disposed within the pressure tube. The piston rod includes a rod chamber defined within the piston rod and extending along the longitudinal axis from an upper chamber end distal to the piston end to a lower chamber end proximal to the piston end. The piston rod further includes at least one first opening disposed proximal to the lower chamber end. The shock absorber further includes a first piston assembly, an auxiliary housing, and a damper assembly including a sleeve received within the rod chamber.

20 Claims, 7 Drawing Sheets

(56) References Cited

U.S. PATENT DOCUMENTS

| | | | |
|---|---|---|---|
| 4,874,066 A | 10/1989 | Silberstein | |
| 4,953,671 A | 9/1990 | Imaizumi | |
| 5,058,715 A | 10/1991 | Silberstein | |
| 5,248,014 A | 9/1993 | Ashiba | |
| 5,505,225 A | 4/1996 | Niakan | |
| 6,220,409 B1 | 4/2001 | Deferme | |
| 6,915,885 B2 * | 7/2005 | Forster | F16F 9/46 188/266.5 |
| 6,918,473 B2 * | 7/2005 | Deferme | F16F 9/5126 188/282.1 |
| 7,100,750 B2 * | 9/2006 | Drees | F16F 9/5126 188/280 |
| 7,172,058 B2 * | 2/2007 | Burkert | F16F 9/5126 188/315 |
| 7,255,211 B2 * | 8/2007 | Gotz | F16F 9/5126 188/322.22 |
| 7,441,639 B2 * | 10/2008 | Gotz | F16F 9/5126 188/282.1 |
| 7,946,399 B2 * | 5/2011 | Masamura | F16F 9/465 188/282.4 |
| 8,028,813 B2 * | 10/2011 | Kim | F16F 9/5126 188/289 |
| 8,393,447 B2 * | 3/2013 | Breun | F16F 9/3415 188/282.1 |
| 8,590,677 B2 * | 11/2013 | Kim | F16F 9/5126 188/280 |
| 8,651,252 B2 | 2/2014 | Katayama et al. | |
| 8,695,766 B2 | 4/2014 | Yamashita et al. | |
| 8,746,423 B2 * | 6/2014 | Maeda | F16F 9/49 277/587 |
| 8,833,532 B2 | 9/2014 | Yamashita | |
| 8,844,687 B2 * | 9/2014 | Yu | F16F 9/5126 188/280 |
| 9,239,092 B2 | 1/2016 | Nowaczyk et al. | |
| 9,291,231 B2 | 3/2016 | Kim et al. | |
| 9,541,153 B2 * | 1/2017 | Park | F16F 9/3405 |
| 9,964,172 B2 * | 5/2018 | Zeissner | F16F 9/348 |
| 10,479,160 B2 * | 11/2019 | Roessle | B60G 17/08 |
| 10,518,601 B2 * | 12/2019 | Van De Plas | F16F 9/19 |
| 10,570,983 B2 * | 2/2020 | Patel | F16F 9/3405 |
| 10,995,815 B2 * | 5/2021 | Van De Plas | F16F 9/3482 |
| 2003/0029684 A1 * | 2/2003 | Forster | F16F 9/3485 188/282.5 |
| 2007/0209892 A1 | 9/2007 | Masamura | |
| 2009/0057079 A1 | 3/2009 | Vanbrabant | |
| 2012/0205843 A1 * | 8/2012 | Allen | B60G 15/12 267/64.25 |
| 2015/0101900 A1 * | 4/2015 | Kitamura | F16F 9/063 188/314 |
| 2015/0144444 A1 * | 5/2015 | Lim | F16F 9/5126 188/280 |
| 2015/0211594 A1 * | 7/2015 | Parizek | F16H 7/08 267/121 |
| 2016/0025180 A1 * | 1/2016 | Fukushima | F16F 9/3488 188/266.5 |
| 2016/0215846 A1 * | 7/2016 | Noguchi | B62K 25/08 |
| 2016/0288604 A1 | 10/2016 | Teraoka et al. | |
| 2016/0288605 A1 | 10/2016 | Teraoka et al. | |
| 2019/0226544 A1 * | 7/2019 | Titley | F16F 9/063 |

FOREIGN PATENT DOCUMENTS

| | | |
|---|---|---|
| DE | 102008042078 B3 | 7/2010 |
| EP | 1496285 A2 | 1/2005 |
| EP | 1788276 A2 | 5/2007 |
| EP | 2128484 B1 | 4/2012 |
| JP | 2011202789 A | 10/2011 |
| JP | 5851159 B2 | 2/2016 |
| JP | 5981800 B2 | 8/2016 |
| KR | 19980038156 U | 9/1998 |
| KR | 100894798 B1 | 4/2009 |
| KR | 100904150 B1 | 6/2009 |
| KR | 101272755 B1 | 6/2013 |
| WO | 2015082147 A1 | 6/2015 |
| WO | 2017125478 A1 | 7/2017 |
| WO | 2018168865 A1 | 9/2018 |

OTHER PUBLICATIONS

Written Opinion Received in Realted PCT Application No. PCT/US2019/053652 dated Jan. 16, 2020.
Interntaional Search Report and Written Opinion Received in Related PCT/US2019/027457 dated Aug. 2, 2019.

* cited by examiner

SHOCK ABSORBER

TECHNICAL FIELD

The present disclosure relates to a shock absorber for a vehicle, and more particularly, to a shock absorber that provides a different magnitude of damping based on a length of a stroke of the shock absorber.

BACKGROUND

Shock absorbers are typically used in conjunction with automotive suspension systems or other suspension systems to absorb unwanted vibrations that occur during movement of the suspension system. In order to absorb these unwanted vibrations, automotive shock absorbers are generally connected between the sprung (body) and the unsprung (suspension/drivetrain) masses of the vehicle.

In typical shock absorbers, a main piston is located within a fluid chamber defined by a pressure tube and is connected to the sprung mass of the vehicle through a piston rod. The pressure tube is connected to the unsprung mass of the vehicle. The main piston divides the fluid chamber of the pressure tube into a first working chamber and a second working chamber. The main piston includes a compression valving that limits the flow of a hydraulic fluid from the second working chamber to the first working chamber during a compression stroke. The main piston also includes a rebound valving that limits the flow of the hydraulic fluid from the first working chamber to the second working chamber during a rebound or an extension stroke. By controlling the fluid flow between the first working chamber and the second working chamber, a pressure drop is built up between the first working chamber and the second working chamber. As each of the compression valving and the rebound valving has an ability to limit the flow of the hydraulic fluid, the shock absorber is able to produce damping forces that counteract oscillations/vibrations, which would otherwise be transmitted from the unsprung mass to the sprung mass.

Typical shock absorbers provide the same magnitude of damping force regardless of the length of a damper stroke. However, shock absorbers have been developed where the magnitude of the damping force generated by the shock absorber during smaller damper strokes is different from the magnitude of the damping force generated by the shock absorber during larger damper strokes. These multi-force shock absorbers provide a relatively small or low damping force during the normal running of the vehicle and a relatively large or high damping force during maneuvers requiring extended suspension movements. The normal running of the vehicle is generally accompanied by small or fine vibrations of the unsprung mass of the vehicle and thus require a soft ride or low damping characteristic of the suspension system to isolate the sprung mass from these small or fine vibrations. During a turning or braking maneuver, as an example, the sprung mass of the vehicle will attempt to undergo a relatively slow and/or large vibration, which then requires a firm ride or high damping characteristic of the suspension system to support the sprung mass and provide stable handling characteristics to the vehicle. Thus, these multi-force shock absorbers offer the advantage of a smooth steady state ride by eliminating the high frequency/small excitations from the sprung mass, while still providing the necessary damping or firm ride for the suspension system during vehicle maneuvers causing larger excitations of the sprung mass.

Therefore, some of the shock absorbers provide two stages of damping (hard and soft) by utilizing a stroke dependent damper assembly that is mounted to a post of the piston rod below a main piston assembly including the main piston. The stroke dependent damper assembly includes a floating piston that is longitudinally moveable between two rubber travel stops. The inclusion of the stroke dependent damper assembly in the pressure tube may cause an increased dead length of the shock absorber, thereby reducing a range of movement of the main piston within the pressure tube of the shock absorber. An increased dead length in the shock absorber may cause a damage to upper and lower shock mounts of the shock absorber, and a faulty operation of the main piston.

Further, due to increased dead length, conventional shock absorbers with the stroke dependent damper assembly may have a lower stroke capability. The lower stroke capability of the shock absorbers may affect performance of the shock absorbers to achieve a desirable damping of the vehicle vibrations.

Moreover, due to a greater size of the stroke dependent damper assembly, the shock absorber may require relatively large bores of the main piston and the pressure tube. Therefore, due to larger bore levels of the main piston and the pressure tube, the conventional shock absorbers including the stroke dependent damper assembly may have an overall increased manufacturing cost.

SUMMARY

According to a first aspect, there is provided a shock absorber for a vehicle. The shock absorber includes a pressure tube containing a hydraulic fluid. The shock absorber further includes a piston rod extending within the pressure tube along a longitudinal axis. The piston rod includes a piston end disposed within the pressure tube. The piston rod further includes a rod chamber defined within the piston rod. The rod chamber extends along the longitudinal axis from an upper chamber end distal to the piston end to a lower chamber end proximal to the piston end. The piston rod further includes at least one first opening disposed proximal to the lower chamber end and extending through the piston rod to fluidly communicate the rod chamber with the pressure tube. The shock absorber further includes a first piston assembly slidably fitted in the pressure tube for movement along the longitudinal axis. The first piston assembly is coupled to the piston rod and separates the pressure tube into a first working chamber and a second working chamber. The first piston assembly includes a first valve assembly that controls fluid flow between the first working chamber and the second working chamber. The shock absorber further includes an auxiliary housing disposed in the pressure tube and coupled to the piston rod proximal to the piston end. The first piston assembly is disposed between the rod chamber and the auxiliary housing relative to the longitudinal axis. The auxiliary housing is disposed in fluid communication with the rod chamber. The auxiliary housing includes a second valve assembly that controls fluid flow between the second working chamber and the rod chamber. The shock absorber further includes a damper assembly. The damper assembly includes a sleeve disposed at least partially within the rod chamber and extending at least between the upper chamber end and the lower chamber end. An inner chamber is defined within the sleeve and an annular chamber is defined between the sleeve and the piston rod. The sleeve includes at least one second opening disposed proximal to the upper chamber end and extending through the sleeve to fluidly communicate the inner chamber with the annular chamber. The at least one second opening is axially spaced apart from the at least one first opening relative to the longitudinal axis. The damper assembly further includes a floating piston slidably received within the sleeve and separating the inner chamber into an upper inner chamber and a lower inner chamber. The at least one second opening fluidly communicates the upper inner chamber with the annular chamber and the lower inner chamber is disposed in fluid communication with the auxiliary housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

Figure 1:
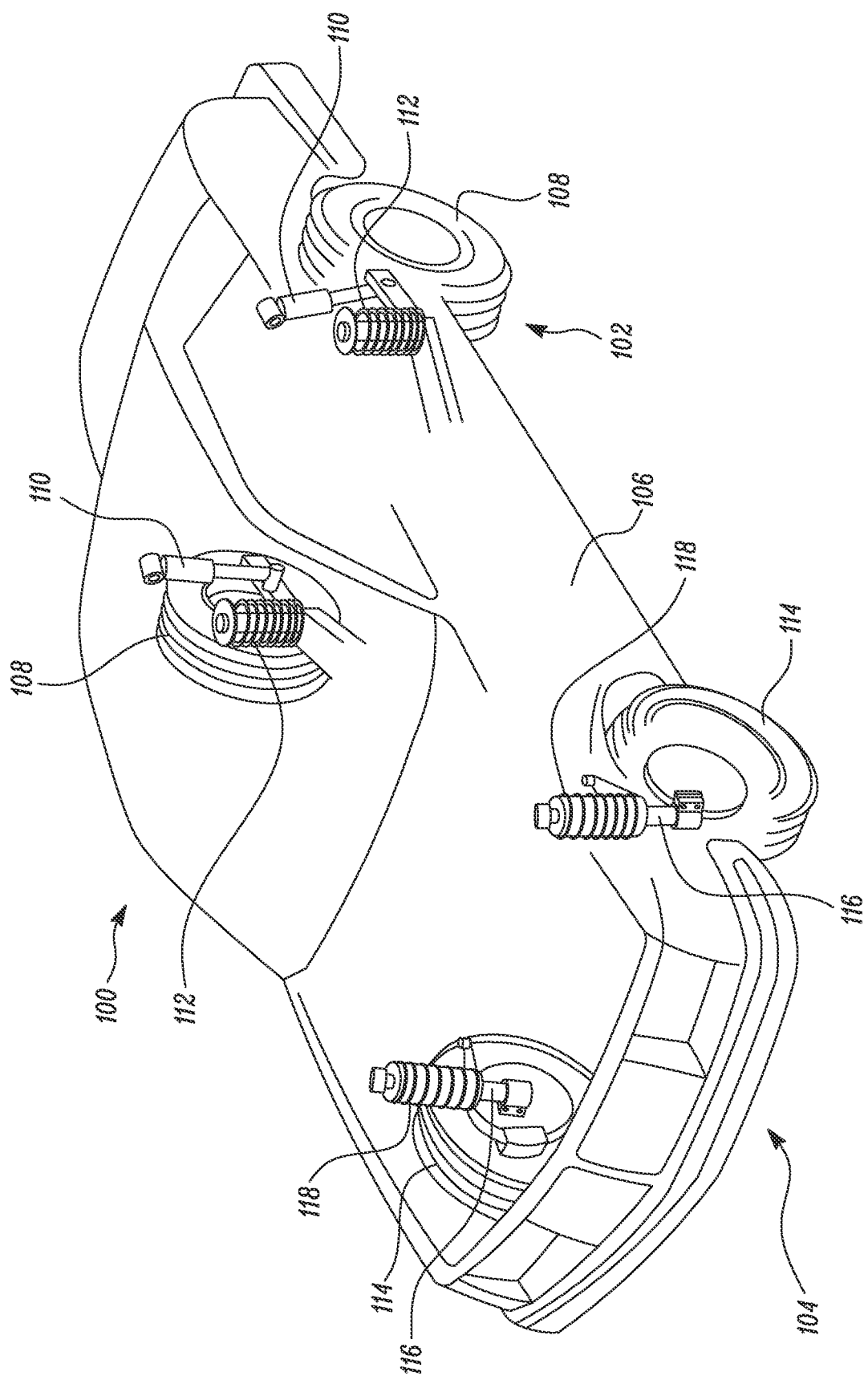
FIG. 1 is an illustration of a vehicle, according to an embodiment of the present disclosure.

The following description of the preferred embodiment(s) is merely exemplary in nature and is in no way intended to limit the invention, its application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring now to the drawings in which like reference numerals designate like or corresponding parts throughout the several views.

FIG. 1 illustrates a vehicle 100 according to an embodiment of the present disclosure. The vehicle 100 includes a rear suspension 102, a front suspension 104, and a body 106.

The rear suspension 102 has a transversely extending rear axle assembly (not shown) adapted to operatively support the vehicle's rear wheels 108. The rear axle assembly is operatively connected to the body 106 by a pair of shock absorbers 110 and a pair of helical coil springs 112. Similarly, the front suspension 104 includes a transversely extending front axle assembly (not shown) to operatively support the vehicle's front wheels 114. The front axle assembly is operatively connected to the body 106 by another pair of shock absorbers 116 and by another pair of helical coil springs 118.

The shock absorbers 110, 116 serve to dampen a relative motion of the unsprung portion (i.e., the front and rear suspensions 104 and 102, respectively) and the sprung portion (i.e., body 106) of the vehicle 100. While the vehicle 100 has been depicted as a passenger car having front and rear axle assemblies, the shock absorbers 110, 116 may be used with other types of vehicles or machinery, or in other types of applications such as vehicles incorporating independent front and/or independent rear suspension systems. Further, the term "shock absorber" as used herein is meant to refer to shock absorbers and shock absorber systems in general and thus may include MacPherson struts, and semi-active and active shock absorbers. It should also be appreciated that the scope of the subject disclosure is intended to include shock absorber systems for stand-alone shock absorbers 110 and coil-over shock absorbers 116.

Figure 2:
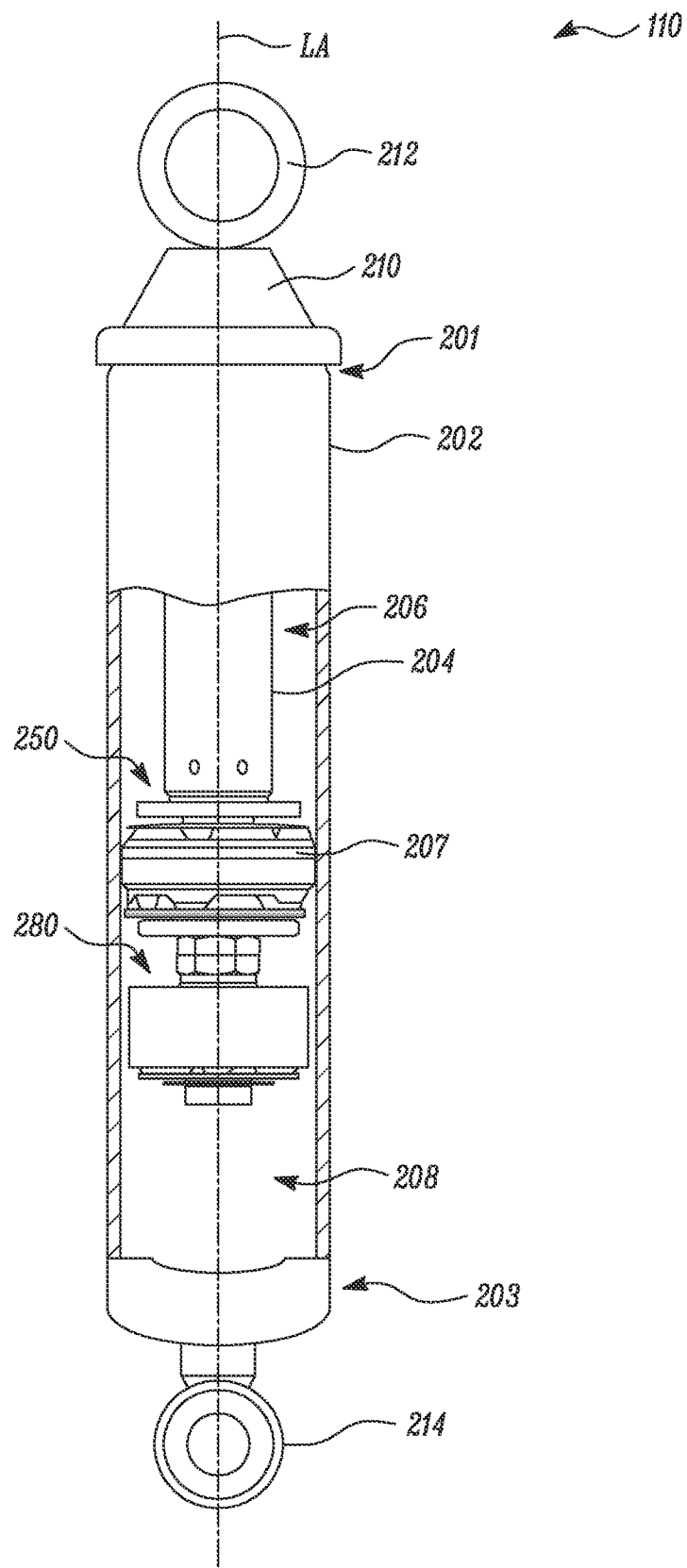
FIG. 2 is a side sectional view of a shock absorber of the vehicle of FIG. 1, according to an embodiment of the present disclosure.

FIG. 2 illustrates the shock absorber 110 for the vehicle 100, according to an embodiment of the present disclosure. The shock absorber 110 includes a pressure tube 202 containing a hydraulic fluid. The shock absorber 110 further includes a piston rod 204 extending within the pressure tube 202 along a longitudinal axis LA. The piston rod 204 reciprocates along the longitudinal axis LA. Thus, the pressure tube 202 and the piston rod 204 extend co-axially along the longitudinal axis LA.

The shock absorber 110 further includes a first piston assembly 250 slidably fitted in the pressure tube 202 for movement along the longitudinal axis LA. The first piston assembly 250 is coupled to the piston rod 204 and separates the pressure tube 202 into a first working chamber 206 and a second working chamber 208. The shock absorber 110 also includes a seal 207 disposed between the first piston assembly 250 and the pressure tube 202 to permit sliding movement of the first piston assembly 250 with respect to the pressure tube 202 without generating undue frictional forces as well as sealing the first working chamber 206 from the second working chamber 208.

Further, the piston rod 204 extends through the first working chamber 206 and through an upper end cap 210 which closes a first end 201 of the pressure tube 202. The shock absorber 110 further includes an attachment end 212 connected to the piston rod 204 opposite to the first piston assembly 250. The attachment end 212 is connected to the body 106 of the vehicle 100 (i.e., the sprung portion of the vehicle 100).

The shock absorber 110 further includes an auxiliary housing 280 disposed in the pressure tube 202. The shock absorber 110 also includes a damper assembly 400 (shown in FIG. 3). The first piston assembly 250, the auxiliary housing 280, and the damper assembly 400 will be discussed later in detail.

Furthermore, the shock absorber 110 includes an attachment fitting 214 at a second end 203 of the pressure tube 202. The attachment fitting 214 is connected to the unsprung portion (i.e., the front or rear suspensions 104, 102) of the vehicle 100. It should be appreciated that the shock absorber 110 may be installed in a reverse orientation, where the attachment end 212 of the piston rod 204 is connected to the front or rear suspensions 104, 102 (i.e., sprung portions of the vehicle 100), and the attachment fitting 214 is connected to the body 106 (i.e., the sprung portion of the vehicle 100). While FIG. 2 shows only the shock absorber 110, it is to be understood that shock absorber 116 only differs from the shock absorber 110 in a way in which it is adapted to be connected to the sprung and unsprung portions of the vehicle 10 and the mounting location of the coil spring 118 relative to the shock absorber 116.

The first working chamber 206 is positioned between the first end 201 of the pressure tube 202 and the first piston assembly 250. The second working chamber 208 is positioned between the second end 203 of the pressure tube 202 and the first piston assembly 250. Suspension movements of the vehicle 100 will cause extension/rebound or compression movements of the first piston assembly 250 with respect to the pressure tube 202. In some cases, the shock absorber 110 further includes a gas chamber (not shown) defined by a separating piston positioned in the pressure tube 30. The gas chamber may compensate for volume changes inside the first working chamber 206 as a result of the volume of the piston rod 204 that is inserted or taken out of the first working chamber 206 due to movements of the piston rod 204 during the compression and rebound strokes of the shock absorber 110.

Figure 3:
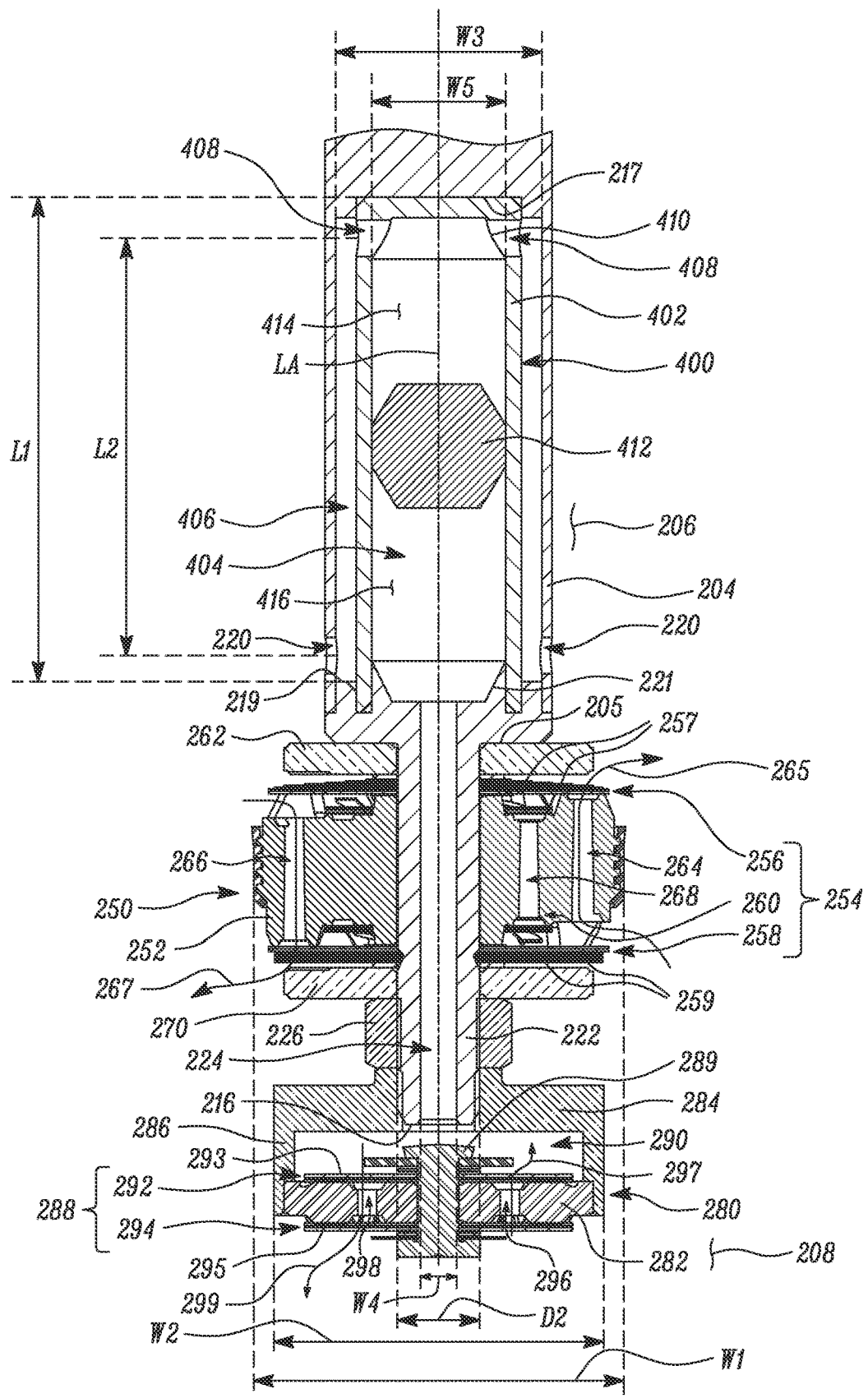
FIG. 3 is a side cross-sectional view of a first piston assembly, an auxiliary housing, a piston rod, and a damper assembly of the shock absorber of FIG. 2, where a floating piston of the damper assembly is shown in an intermediate position, according to an embodiment of the present disclosure.
Figure 4:
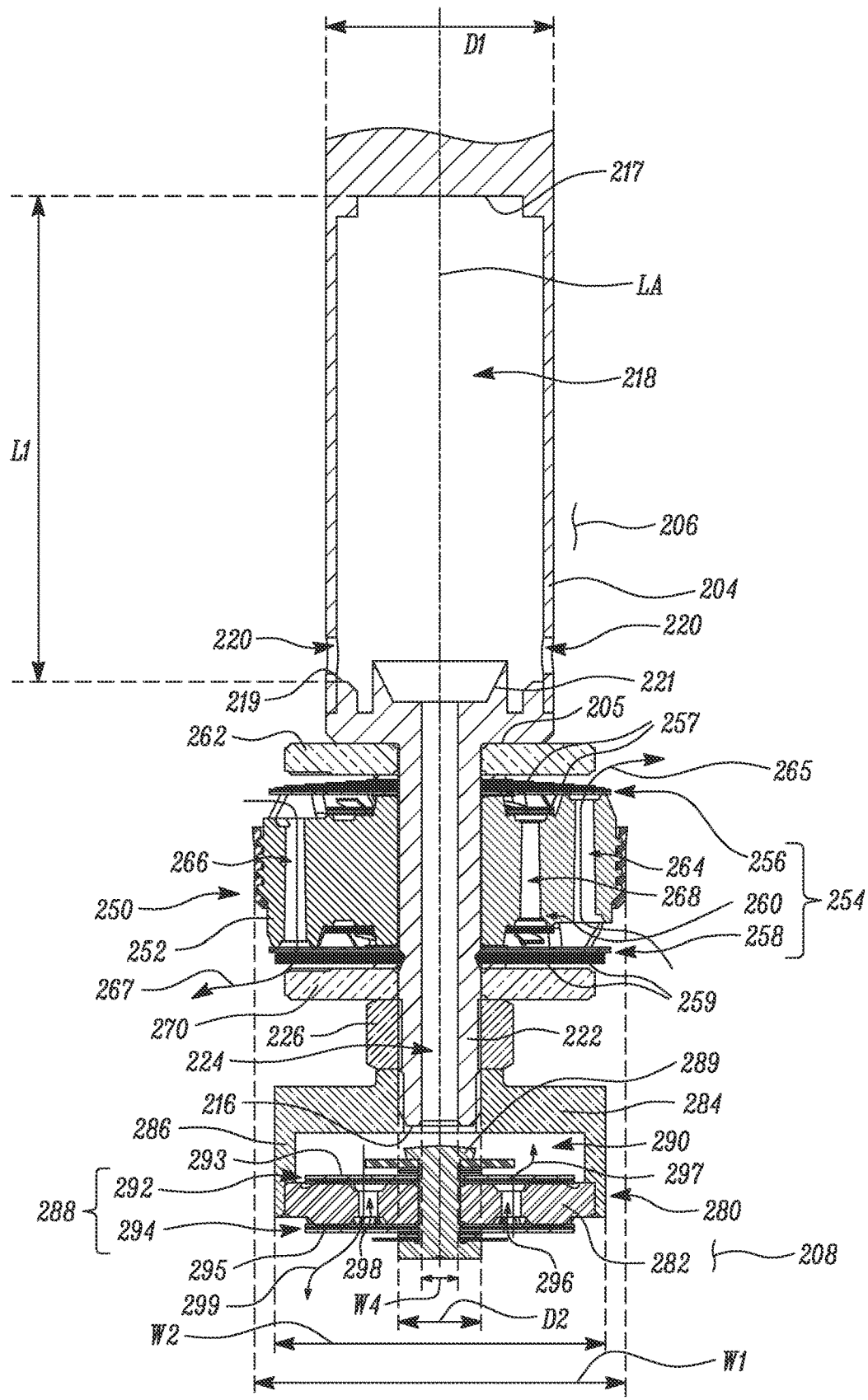
FIG. 4 is another side cross-sectional view of the first piston assembly, the auxiliary housing, and the piston rod of the shock absorber of FIG. 2 with the damper assembly not shown, according to an embodiment of the present disclosure.

FIG. 3 illustrates the first piston assembly 250, the auxiliary housing 280, the piston rod 204, and the damper assembly 400, according to an embodiment of the present disclosure. FIG. 4 illustrates the first piston assembly 250, the auxiliary housing 280, and the piston rod 204. For illustrative purposes, the damper assembly 400 is not shown in FIG. 4. Further, the pressure tube 202 is omitted in FIGS. 3 and 4 for the purpose of clarity. However, the first and second working chambers 206, 208 are schematically shown in FIGS. 3 and 4 for the purpose of description.

With reference to FIGS. 3 and 4, the piston rod 204 includes a piston end 216 disposed within the pressure tube 202. The piston rod 204 further includes a rod chamber 218 defined within the piston rod 204. The rod chamber 218 extends along the longitudinal axis LA from an upper chamber end 217 distal to the piston end 216 to a lower chamber end 219 proximal to the piston end 216. The piston rod 204 has a rod diameter D1 at the lower chamber end 219. The rod chamber 218 defines a chamber length L1 between the upper chamber end 217 and the lower chamber end 219. In some embodiments, the piston rod 204 further includes a lower tapered section 221 adjacent to the lower chamber end 219 of the rod chamber 218. The rod chamber 218 has a maximum width W3.

The piston rod 204 further includes at least one first opening 220 disposed proximal to the lower chamber end 219 and extending through the piston rod 204 to fluidly communicate the rod chamber 218 with the pressure tube 202. Therefore, the rod chamber 218 is in fluid communication with the pressure tube 202, through the at least one first opening 220. Specifically, the at least one first opening 220 fluidly communicates the rod chamber 218 with the first working chamber 206. In some embodiments, the at least one first opening 220 includes a plurality of first openings 220 angularly spaced apart from each other about the longitudinal axis LA. In the illustrated embodiments of FIGS. 3 and 4, the at least one first opening 220 includes two first openings 220 in total. The two first openings 220 are angularly spaced apart from each other by 180 degrees about the longitudinal axis LA. In some other embodiments, the least one first opening 220 may include more than two first openings 220 angularly spaced apart from each other about the longitudinal axis LA.

Referring to FIG. 3, the first piston assembly 250 includes a first piston body 252 attached to the piston rod 204 at a location between the lower chamber end 219 and the piston end 216. The first piston assembly 250 further includes a first valve assembly 254 that controls fluid flow between the first working chamber 206 and the second working chamber 208. Specifically, the first valve assembly 254 controls the movement of hydraulic fluid between the first working chamber 206 and the second working chamber 208 during movement of the first piston assembly 250 within the pressure tube 202. The first piston assembly 250 has a first maximum width W1.

The first valve assembly 254 includes a first compression valve 256, a first rebound valve 258, and one or more bleed valves 260. The first piston body 252 defines one or more compression flow passages 264, one or more rebound flow passages 266, and one or more bleed flow passages 268. In the illustrated embodiments of FIGS. 3 and 4, the bleed flow passages 268 extend through the first piston body 252 along the longitudinal axis LA. Further, the bleed flow passages 268 extend at positions located radially inward of the compression flow passages 264 and the rebound flow passages 266.

The first compression valve 256 operates to control fluid flow through the compression flow passages 264 in the first piston body 252. The first rebound valve 258 operates to control fluid flow through the rebound flow passages 266 in the first piston body 252. Further, the bleed valves 260 operate to control fluid flow through the bleed flow passages 268 in the first piston body 252. Therefore, the first compression, the first rebound, and the bleed valves 256, 258, 260, respectively control fluid flow between the first and second working chambers 206, 208 and thus, cooperate to form the first valve assembly 254.

With continued reference to FIGS. 3 and 4, the first compression valve 256 includes a plurality of compression valve plates 257. The compression valve plates 257 are disposed adjacent to the first piston body 252 to close the compression flow passages 264. During a compression stroke of the shock absorber 110, fluid pressure builds up in the second working chamber 208 until the fluid pressure applied to the compression valve plates 257, through the compression flow passages 264, overcomes the load required to deflect the compression valve plates 257. The compression valve plates 257 elastically deflect to open the compression flow passages 264 and allow the hydraulic fluid to flow from the second working chamber 208 to the first working chamber 206, as shown by a flow path 265 in FIG. 3.

The shock absorber 110 further includes an upper washer 262 disposed between the first piston assembly 250 and a shoulder 205 of the piston rod 204 relative to the longitudinal axis LA. Specifically, the upper washer 262 is disposed between the first compression valve 256 and the shoulder 205 of the piston rod 204 to limit the deflection of the compression valve plates 257.

The first rebound valve 258 includes a plurality of rebound valve plates 259. The rebound valve plates 259 are disposed adjacent to the first piston body 252 and opposite to the compression valve plates 257 to close the rebound flow passages 266. During an extension or a rebound stroke of the shock absorber 110, fluid pressure builds up in the first working chamber 206 until the fluid pressure applied to the rebound valve plates 259, through the rebound flow passages 266, overcomes the load required to deflect the rebound valve plates 259. The rebound valve plates 259 elastically deflect to open the rebound flow passages 266 to allow the hydraulic fluid to flow from the first working chamber 206 to the second working chamber 208, as shown by a flow path 267 in FIG. 3.

The shock absorber 110 further includes a lower washer 270 such that the first rebound valve 258 is disposed between the first piston body 252 and the lower washer 270. The lower washer 270 limits the deflection of the rebound valve plates 259.

With continued reference to FIGS. 3 and 4, the auxiliary housing 280 is coupled to the piston rod 204 proximal to the piston end 216. The first piston assembly 250 is disposed between the rod chamber 218 and the auxiliary housing 280 relative to the longitudinal axis LA. The auxiliary housing 280 is disposed in fluid communication with the rod chamber 218. The auxiliary housing 280 has a second maximum width W2. In some embodiments, the first maximum width W1 of the first piston assembly 250 is greater than the second maximum width W2 of the auxiliary housing 280.

The piston rod 204 further includes a post 222 extending from the piston end 216 and coupled to each of the first piston assembly 250 and the auxiliary housing 280. Thus, each of the first piston assembly 250 and the auxiliary housing 280 is coupled to the post 222 of the piston rod 204. The shock absorber 110 further includes a nut 226 coupled to the post 222 and disposed between the first piston assembly 250 and the auxiliary housing 280 relative to the longitudinal axis LA. The lower washer 270 is disposed between the first piston assembly 250 and the nut 226 relative to the longitudinal axis LA.

The post 222 has a post diameter D2. In some embodiments, the post diameter D2 is less than the rod diameter D1 of the piston rod 204 at the lower chamber end 219. In some embodiments, the post diameter D2 is at most 70% of the rod diameter D1 of the piston rod 204. In some other embodiments, the post diameter D2 is at most 60% of the rod diameter D1 of the piston rod 204.

The post 222 defines a rod passage 224 extending along the longitudinal axis LA from the piston end 216 to the lower chamber end 219. The rod passage 224 fluidly communicates the auxiliary housing 280 with the rod chamber 218. Therefore, the hydraulic fluid is free to flow between the rod chamber 218 and the auxiliary housing 280 through the rod passage 224. The rod passage 224 has a maximum width W4. In some embodiments, the maximum width W4 of the rod passage 224 is less than the maximum width W3 of the rod chamber 218. In some embodiments, the maximum width W4 of the rod passage 224 is at most 50% of the maximum width W3 of the rod chamber 218. In some other embodiments, the maximum width W4 of the rod passage 224 is at most 40% of the maximum width W3 of the rod chamber 218.

With continued reference to FIGS. 3 and 4, the auxiliary housing 280 includes a second piston body 282, a base portion 284, and an extension portion 286. The second piston body 282 is disposed at least partially within the extension portion 286. The base portion 284 of the auxiliary housing 280 is coupled to the post 222 of the piston rod 204 at the piston end 216. The auxiliary housing 280 further includes a second valve assembly 288 that controls fluid flow between the second working chamber 208 and the rod chamber 218. Specifically, the second valve assembly 288 controls fluid flow between the second working chamber 208 and the rod passage 224. The auxiliary housing 280 further includes an auxiliary chamber 290 fluidly disposed between the rod passage 224 and the second valve assembly 288.

The second valve assembly 288 includes a second compression valve 292 and a second rebound valve 294. The second piston body 282 defines one or more compression flow passages 296 and one or more rebound flow passages 298. The second compression valve 292 operates to control fluid flow through the compression flow passages 296 in the second piston body 282. The second rebound valve 294 operates to control fluid flow through the rebound flow passages 298 in the second piston body 282. Therefore, the second compression valve 292 and the second rebound valve 294 control fluid flow between the second working chamber 208 and the auxiliary chamber 290, and thus cooperate to form the second valve assembly 288.

With continued reference to FIGS. 3 and 4, the second compression valve 292 includes a compression disc stack 293 that is mounted to the second piston body 282. The compression disc stack 293 is disposed proximal to the auxiliary chamber 290 to close the compression flow passages 296. During the compression stroke of the shock absorber 110, fluid pressure builds up in the second working chamber 208 until the fluid pressure applied to the compression disc stack 293, through the compression flow passages 296, overcomes the load required to deflect the compression disc stack 293. The compression disc stack 293 elastically deflects to open the compression flow passages 296 and allow the hydraulic fluid to flow from the second working chamber 208 to the auxiliary chamber 290, as shown by a flow path 297 in FIG. 3.

The second rebound valve 294 includes a rebound disc stack 295 that is mounted to the second piston body 282. The rebound disc stack 295 is disposed distal to the auxiliary chamber 290 and opposite to the compression disc stack 293 to close the rebound flow passages 298. During the extension or rebound stroke of the shock absorber 110, fluid pressure builds up in the auxiliary chamber 290 until the fluid pressure applied to the rebound disc stack 295, through the rebound flow passages 298, overcomes the load required to deflect the rebound disc stack 295. The rebound disc stack 295 elastically deflects to open the rebound flow passages 298 to allow the hydraulic fluid to flow from the auxiliary chamber 290 to the second working chamber 208, as shown by a flow path 299 in FIG. 3. The compression disc stack 293 and the rebound disc stack 295 are attached to the second piston body 282 with a rivet 289.

In some embodiments, the first valve assembly 254 is configured to open at a first threshold pressure difference PD1 applied across the first valve assembly 254. The second valve assembly 288 is configured to open at a second threshold pressure difference PD2 applied across the second valve assembly 288. In some embodiments, the first threshold pressure difference PD1 is greater than the second threshold pressure difference PD2. Therefore, at a given pressure difference during a compression stroke or a rebound stroke of the shock absorber 110, the second valve assembly 288 opens earlier than the first valve assembly 254.

Referring again to FIG. 3, the damper assembly 400 includes a sleeve 402 disposed at least partially within the rod chamber 218 and extending at least between the upper chamber end 217 and the lower chamber end 219. An inner chamber 404 is defined within the sleeve 402 and an annular chamber 406 is defined between the sleeve 402 and the piston rod 204. Thus, the annular chamber 406 is fluidly communicated with the at least one first opening 220. The inner chamber 404 has a maximum width W5. In some embodiments, the maximum width W5 of the inner chamber 404 is greater than 20% and less than 90% of the maximum width W3 of the rod chamber 218. In some other embodiments, the maximum width W5 of the inner chamber 404 is greater than 30% of the maximum width W3 of the rod chamber 218.

Further, the sleeve 402 includes at least one second opening 408 disposed proximal to the upper chamber end 217. The at least one second opening 408 extends through the sleeve 402 to fluidly communicate the inner chamber 404 with the annular chamber 406. In other words, the at least one second opening 408 is fluidly communicated with the at least one first opening 220 through the annular chamber 406. Therefore, the inner chamber 404 is fluidly communicated with the first working chamber 206 through the at least one first opening 220, the annular chamber 406, and the at least one second opening 408.

In some embodiments, the at least one second opening 408 includes a plurality of second openings 408 angularly spaced apart from each other about the longitudinal axis LA. In the illustrated embodiments of FIGS. 3 and 4, the at least one second opening 408 includes two second openings 408 in total. The two second openings 408 are angularly spaced apart from each other by 180 degrees about the longitudinal axis LA. In some other embodiments, the at least one second opening 408 may include more than two second openings 408 angularly spaced apart from each other about the longitudinal axis LA.

The at least one second opening 408 is axially spaced apart from the at least one first opening 220 relative to the longitudinal axis LA. In some embodiments, the at least one first opening 220 is axially spaced apart from the at least one second opening 408 by an axial distance L2 along the longitudinal axis LA. The axial distance L2 may be measured between respective central axes of the at least one first opening 220 and the at least one second opening 408. In some embodiments, the axial distance L2 is at least 70% of the chamber length L1 between the upper chamber end 217 and the lower chamber end 219. In some embodiments, the axial distance L2 is at least 80%, or at least 90% of the chamber length L1.

In some embodiments, the sleeve 402 further includes an upper tapered section 410 disposed adjacent to the upper chamber end 217 of the rod chamber 218. In some embodiments, the at least one second opening 408 is disposed in the upper tapered section 410. In the illustrated embodiment of FIG. 3, the two second openings 408 are disposed in the upper tapered section 410.

The at least one first opening 220 may have any suitable shape, for example, but not limited to, circular, elliptical, polygonal, oval, and so forth. Similarly, the at least one second opening 408 may have any suitable shape, for example, but not limited to, circular, elliptical, polygonal, oval, and so forth. Dimensions (e.g., length and width) of the at least one first opening 220 may be based on various parameters, such as a desired flow of the hydraulic fluid through the at least one first opening 220. Similarly, dimensions (e.g., length and width) of the at least one second opening 408 may be based on various parameters, such as a desired flow of the hydraulic fluid through the at least one second opening 408.

With continued reference to FIG. 3, the damper assembly 400 further includes a floating piston 412 slidably received within the sleeve 402. The floating piston 412 separates the inner chamber 404 into an upper inner chamber 414 and a lower inner chamber 416. In the illustrated embodiment of FIG. 3, the floating piston 412 is shown in an intermediate position. The at least one second opening 408 fluidly communicates the upper inner chamber 414 with the annular chamber 406. In other words, the upper inner chamber 414 is in fluid communication with the first working chamber 206 through the at least one first opening 220, the annular chamber 406, and the at least one second opening 408.

The lower inner chamber 416 is disposed in fluid communication with the auxiliary housing 280. Specifically, the lower inner chamber 416 is disposed in fluid communication with the auxiliary chamber 290 of the auxiliary housing 280 through the rod passage 224.

Figure 5:
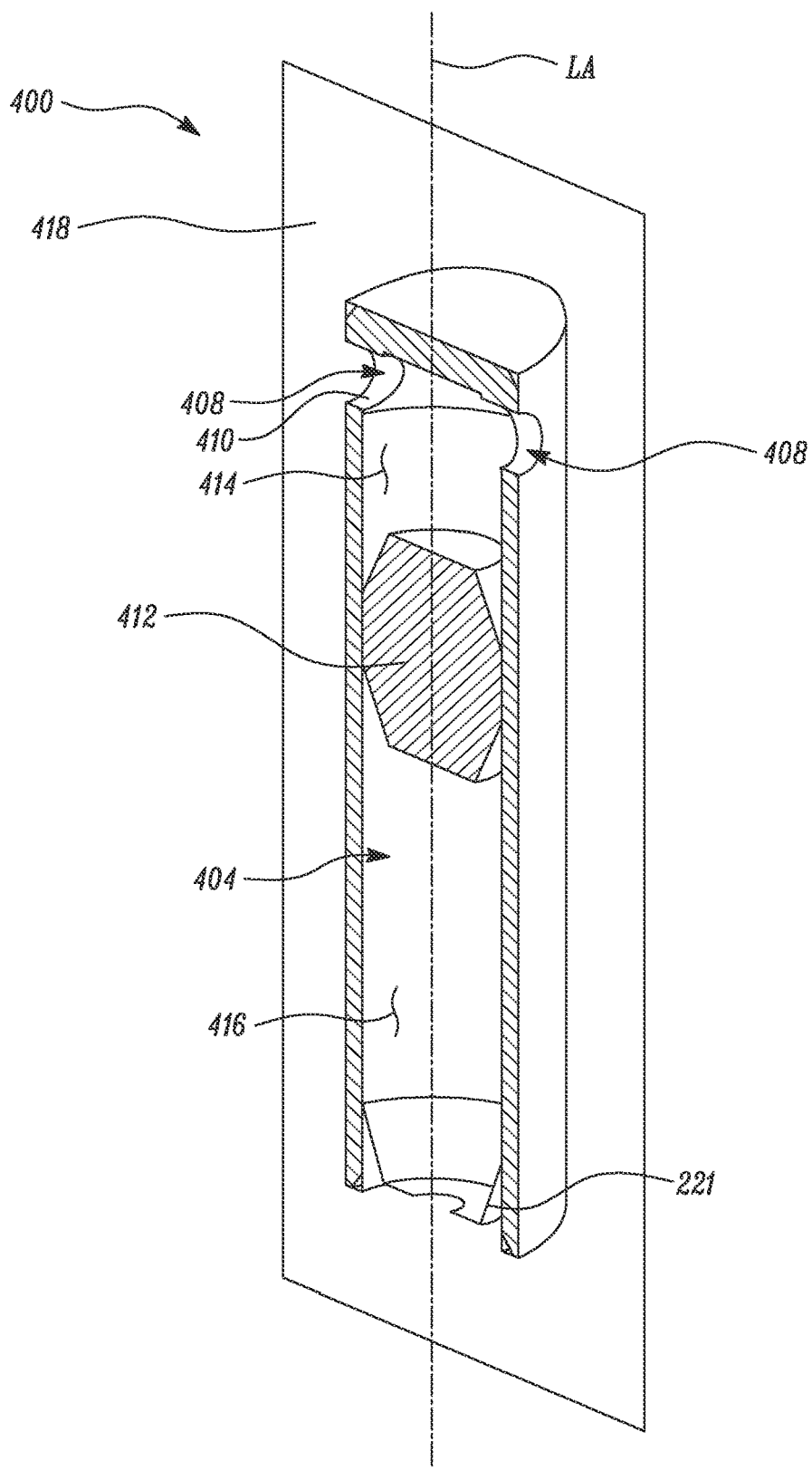
FIG. 5 is a cross-sectional view of the damper assembly of FIG. 3, according to an embodiment of the present disclosure.

FIG. 5 shows a cross-sectional view of the damper assembly 400, according to an embodiment of the present disclosure. In some embodiments, the floating piston 412 has a substantially polygonal cross-section along a plane 418 parallel to the longitudinal axis LA. In the illustrated embodiment of FIG. 5, the floating piston 412 has a hexagonal cross-section in the plane 418. In some other embodiments, the floating piston 412 may have a pentagonal, a quadrilateral, or any other polygonal cross-sections in the plane 418. In some embodiments, the upper tapered section 410 is configured to at least partially receive the floating piston 412 therein. Specifically, upon sliding of the floating piston 412 within the sleeve 402, the floating piston 412 is at least partially received in the upper tapered section 410 of the sleeve 402. Referring to FIGS. 3 and 5, in some embodiments, the lower tapered section 221 is configured to at least partially receive the floating piston 412 therein. Specifically, upon sliding of the floating piston 412 within the sleeve 402, the floating piston 412 is at least partially received in the lower tapered section 221 of the piston rod 204. The upper tapered section 410 may have a shape that is complementary to a shape of at least a corresponding portion of the floating piston 412. Similarly, the lower tapered section 221 may have a shape that is complementary to a shape of at least a corresponding portion of the floating piston 412.

Referring to FIGS. 2 and 3, the shock absorber 110 operates as a multi-stage hydraulic damper, which may provide damping that varies according to stroke length. Soft damping is provided for small strokes and firm damping is provided for large strokes. When the shock absorber 110 undergoes a small stroke, the hydraulic fluid can flow into and out of the inner chamber 404. The flow of hydraulic fluid into and out of the inner chamber 404 causes small movements of the floating piston 412 along the longitudinal axis LA. During small strokes, the hydraulic fluid flows through the second valve assembly 288 along the flow paths 297, 299 depending on whether the shock absorber 110 is in compression or rebound. Further, during small strokes, the hydraulic fluid also flows through the first valve assembly 254 along the flow paths 265, 267 depending on whether the shock absorber 110 is in compression or rebound. Two separate fluid flows through the first valve assembly 254 and the second valve assembly 288 may provide soft damping. In other words, the first valve assembly 254 and the second valve assembly 288 work in parallel with each other during small strokes of the shock absorber 110. When the shock absorber 110 undergoes a large stroke, the flow of hydraulic fluid through the second valve assembly 288 is progressively reduced due to reduced flow through the annular chamber 406 and through the rod passage 224, depending on whether the shock absorber 110 is in compression or rebound. Therefore, during large strokes, the longitudinal movement of the floating piston 412 may slow down and reduce fluid flow through the second valve assembly 288, which may result in firm damping. Hence, the shock absorber 110 may provide a different magnitude of damping based on a length of a stroke of the shock absorber 110.

Figure 6:
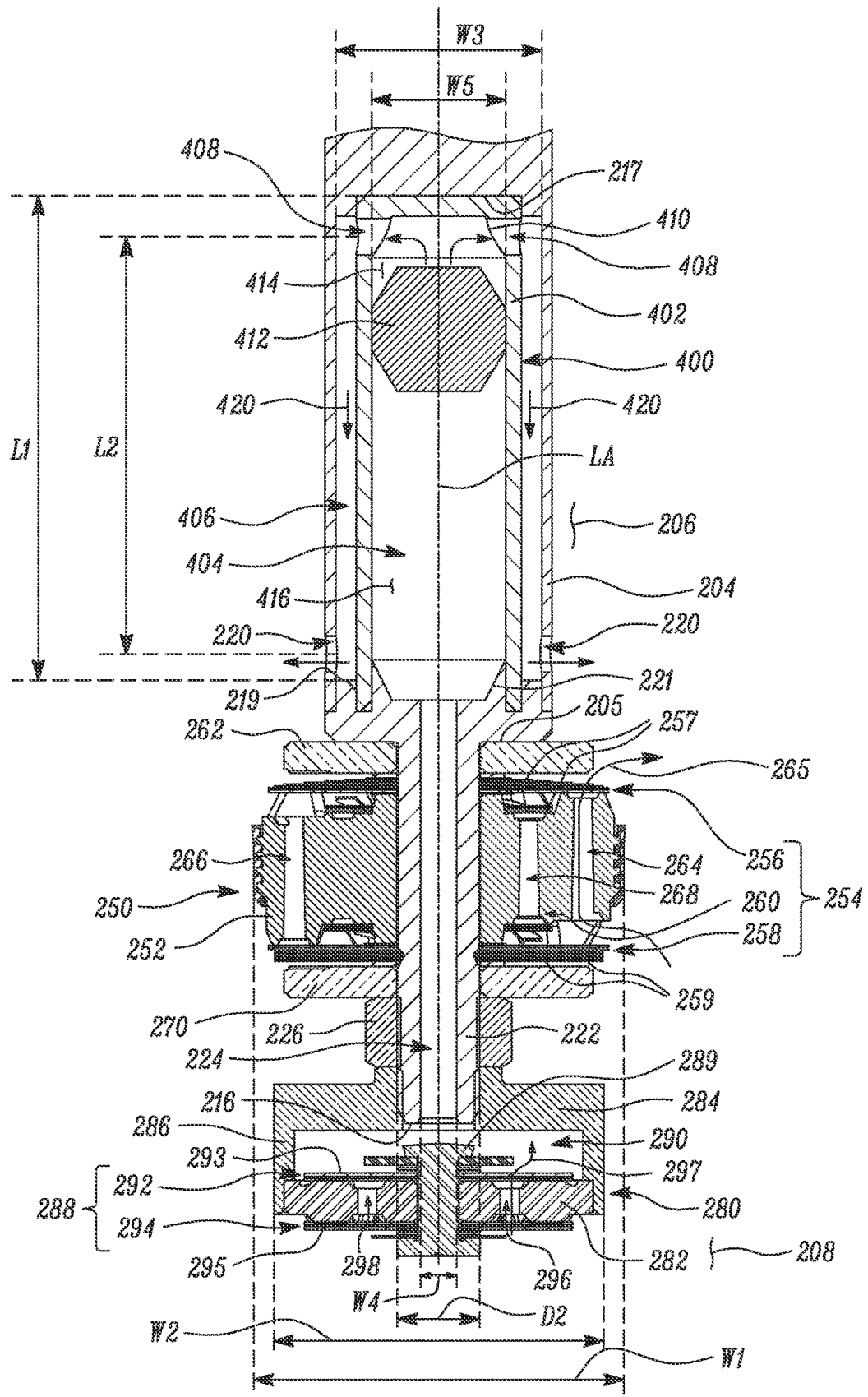
FIG. 6 is a side cross-sectional view of the first piston assembly, the auxiliary housing, and the damper assembly of the shock absorber of FIG. 2, where the floating piston of the damper assembly is shown approaching a retracted position, according to an embodiment of the present disclosure.
Figure 7:
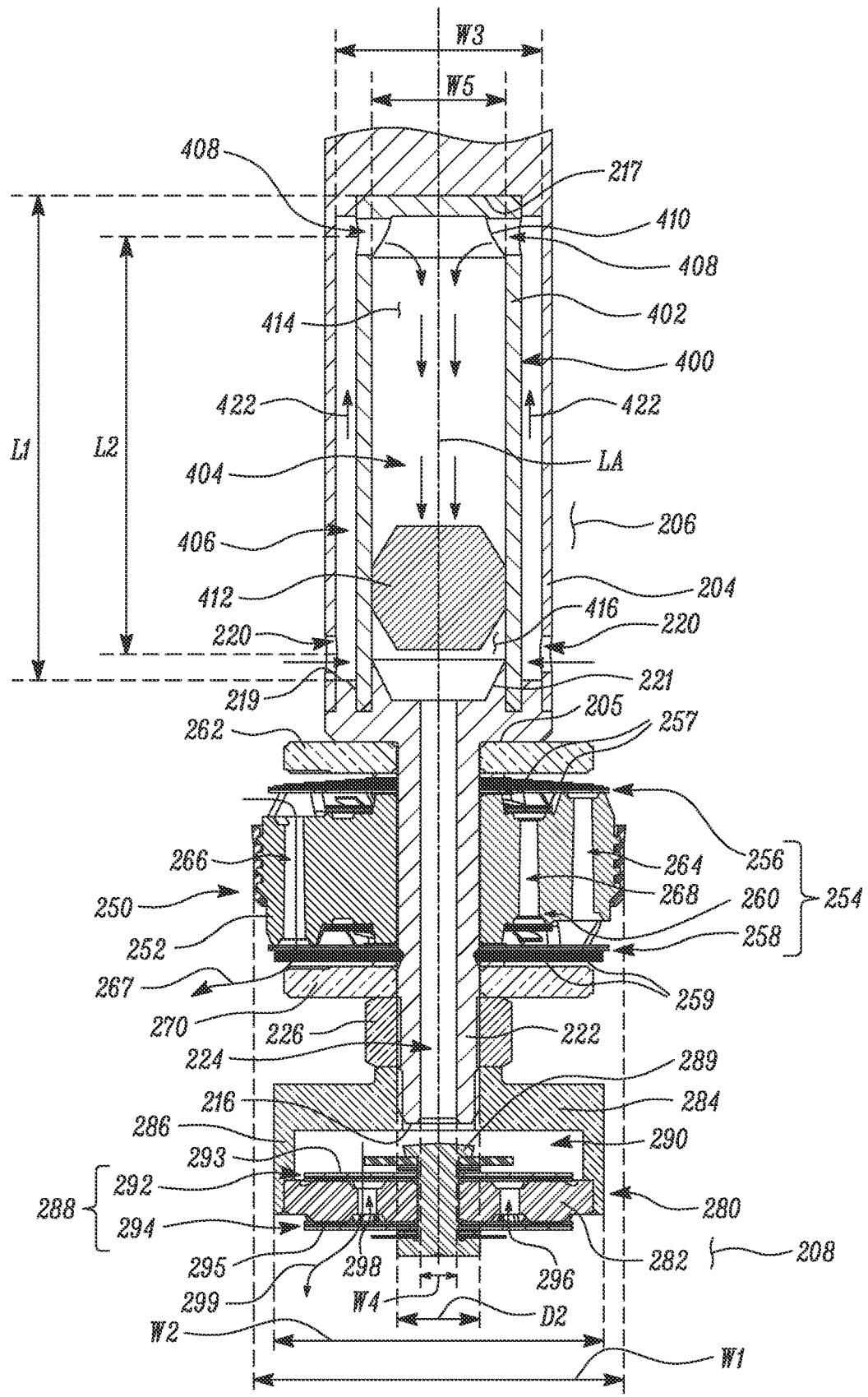
FIG. 7 is a side cross-sectional view of the first piston assembly, the auxiliary housing, and the damper assembly of the shock absorber of FIG. 2, where the floating piston of the damper assembly is shown approaching an extended position, according to an embodiment of the present disclosure.

FIG. 6 illustrates a side cross-sectional view of the first piston assembly 250, the auxiliary housing 280, and the damper assembly 400, where the floating piston 412 is shown approaching a retracted position, according to an embodiment of the present disclosure. FIG. 7 illustrates a side cross-sectional view of the first piston assembly 250, the auxiliary housing 280, and the damper assembly 400, where the floating piston 412 is shown approaching an extended position, according to an embodiment of the present disclosure. Therefore, in some embodiments, the floating piston 412 is moveable between the retracted position proximal to the upper chamber end 217 and the extended position proximal to the lower chamber end 219.

Referring to FIGS. 3 and 6, during the compression stroke, the hydraulic fluid in the second working chamber 208 is forced into the first working chamber 206 through the first valve assembly 254. The hydraulic fluid is forced into the first working chamber 206 by overcoming the load required to deflect the compression valve plates 257, which opens the compression flow passages 264 in the first piston body 252, as shown by the flow path 265. The hydraulic fluid in the second working chamber 208 also flows into the auxiliary chamber 290 through the compression flow passages 296 in the second valve assembly 288, as shown by the flow path 297. The hydraulic fluid then flows through the rod passage 224 and out into the lower inner chamber 416 of the inner chamber 404. The hydraulic fluid in the lower inner chamber 416 pushes the floating piston 412 towards the retracted position proximal to the upper chamber end 217. In other words, the floating piston 412 is configured to move towards the retracted position during the compression stroke of the shock absorber 110.

As the length of the compression stroke increases, the floating piston 412 will approach the retracted position. As the floating piston 412 moves towards the retracted position, the hydraulic fluid flows from the upper inner chamber 414 to the first working chamber 206 through the at least one second opening 408, the annular chamber 406, and the at least one first opening 220. Therefore, during the compression stroke of the shock absorber 110, the hydraulic fluid flows at least through the axial distance L2 to flow from the upper inner chamber 414 to the first working chamber 206, as shown by a flow path 420. In a fully retracted position (not shown) of the floating piston 412, the floating piston 412 is at least partially received in the upper tapered section 410 of the sleeve 402.

For small compression strokes, the hydraulic fluid flows through both the first valve assembly 254 and the second valve assembly 288. Thus, for small compression strokes, the shock absorber 110 including the damper assembly 400 provides soft damping. However, as shown in FIG. 6, as the length of the compression stroke increases, the floating piston 412 approaches the upper tapered section 410 to reduce the amount of fluid flow from the upper inner chamber 414 to the annular chamber 406. This gradually decreases the fluid flow through the annular chamber 406 and a speed at which the floating piston 412 approaches the retracted position. This may further reduce the fluid flow through the compression flow passages 296 in the second valve assembly 288 to provide a smooth transition from initial soft damping to firm damping.

Referring to FIGS. 3 and 7, during the rebound stroke, the hydraulic fluid in the first working chamber 206 is forced into the second working chamber 208 through the first valve assembly 254. The hydraulic fluid is forced into the second working chamber 208 by overcoming the load required to deflect the rebound valve plates 259, which opens the rebound flow passages 266 in the first piston body 252, as shown by the flow path 267. The hydraulic fluid in the first working chamber 206 also flows into the upper inner chamber 414 through the at least one first opening 220, the annular chamber 406, and the at least one second opening 408. Therefore, during the rebound stroke of the shock absorber 110, the hydraulic fluid flows at least through the axial distance L2 to flow from the first working chamber 206 to the upper inner chamber 414, as shown by a flow path 422. The hydraulic fluid in the upper inner chamber 414 pushes the floating piston 412 towards the extended position proximal to the lower chamber end 219. In other words, the floating piston 412 is configured to move towards the extended position during the rebound stroke of the shock absorber 110.

As the length of the rebound stroke increases, the floating piston 412 will approach the extended position. As the floating piston 412 moves towards the extended position, the hydraulic fluid flows from the lower inner chamber 416 to the auxiliary chamber 290 through the rod passage 224. The hydraulic fluid in the auxiliary chamber 290 flows into the second working chamber 208 through the rebound flow passages 298 in the second valve assembly 288, as shown by the flow path 299. In a fully extended position (not shown) of the floating piston 412, the floating piston 412 is at least partially received in the lower tapered section 221 of the piston rod 204.

For small rebound strokes, the hydraulic fluid flows through both the first valve assembly 254 and the second valve assembly 288. Thus, for small rebound strokes, the shock absorber 110 including the damper assembly 400 provides soft damping. However, as shown in FIG. 7, as the length of the rebound stroke increases, the floating piston 412 approaches the lower tapered section 221 to reduce the amount of fluid flow from the lower inner chamber 416 to the rod passage 224. This gradually decreases the fluid flow through the rod passage 224 and a speed at which the floating piston 412 approaches the extended position. This may further reduce the fluid flow through the rebound flow passages 298 in the second valve assembly 288 to provide a smooth transition from initial soft damping to firm damping.

Thus, the shock absorber 110 provides a soft damping setting for small strokes and a firm damping setting for larger strokes. As explained above, the multi-force damping characteristics work both in compression and in rebound or extension. In addition, the multi-force damping depends on the length of the stroke, not the position of the first piston assembly 250, and provides a smooth transition between soft and firm damping to avoid unwanted switching noise. While the shock absorber 110 has been illustrated as a mono-tube shock absorber, it is within the scope of the present invention to incorporate the damper assembly 400 into a dual-tube shock absorber if desired.

Referring to FIGS. 2, 3, 6, and 7, the damper assembly 400 is disposed within the piston rod 204 to extend at least between the upper chamber end 217 and the lower chamber end 219. The shock absorber 110 including the damper assembly 400 disposed within the piston rod 204 may have a reduced dead length, as compared to conventional shock absorbers where a stroke dependent damper assembly is disposed within a pressure tube. The reduced dead length of the shock absorber 110 may prevent any damage to the attachment end 212 and the attachment fitting 214 of the shock absorber 110, which may otherwise be noticed in the conventional shock absorbers with an increased dead length. Further, the reduced dead length of the shock absorber 110 may not produce any faulty or defective operation of the first piston assembly 250 due to an otherwise increased dead length of the shock absorber 110.

Further, the shock absorber 110 including the damper assembly 400 may have an improved stroke capability due to reduced dead length. The improved stroke capability of the shock absorber 110 may enhance an operation of components of the shock absorber 110 to achieve a desirable damping of the vehicle vibrations. Moreover, due to inclusion of the damper assembly 400 within the piston rod 204, the shock absorber 110 may accommodate relatively smaller bore levels of the pressure tube 202 and the first piston assembly 250, as compared to the conventional shock absorbers having a stroke dependent damper assembly. This may reduce an overall manufacturing cost of the shock absorber 110.

Furthermore, in the compression stroke, the hydraulic fluid in the upper inner chamber 414 flows through the axial distance L2 in the annular chamber 406 and out into the first working chamber 206. Thus, in the compression stroke, the hydraulic fluid enters the annular chamber 406 through the at least one second opening 408 distal to the first piston assembly 250 and exits the annular chamber 406 through the at least one first opening 220 proximal to the first piston assembly 250. In the rebound stroke, the hydraulic fluid in the first working chamber 206 flows through the axial distance L2 in the annular chamber 406 and out into the upper inner chamber 414. Thus, in the rebound stroke, the hydraulic fluid enters the annular chamber 406 through the at least one first opening 220 proximal to the first piston assembly 250 and exits the annular chamber 406 through the at least one second opening 408 distal to the first piston assembly 250. For both the compression and rebound strokes, the axial distance L2 provided by the rod chamber 218 and the damper assembly 400 increases a fluid travel distance between the upper inner chamber 414 and the first working chamber 206. In other words, the hydraulic fluid has to travel at least the axial distance L2 during the compression and rebound strokes. This may increase an effective stroke length of the damper assembly 400 without requiring any additional axial length along the longitudinal axis LA. An increased length of the fluid flow between the upper inner chamber 414 and the first working chamber 206 may provide an improved comfort damping of the suspension and vehicle vibrations.

While aspects of the present disclosure have been particularly shown and described with reference to the embodiments above, it will be understood by those skilled in the art that various additional embodiments can be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A shock absorber for a vehicle, the shock absorber comprising:
   a pressure tube containing a hydraulic fluid;
   a piston rod extending within the pressure tube along a longitudinal axis, the piston rod comprising a piston end disposed within the pressure tube, a rod chamber defined within the piston rod and extending along the longitudinal axis from an upper chamber end distal to the piston end to a lower chamber end proximal to the piston end, and at least one first opening disposed proximal to the lower chamber end and extending through the piston rod to fluidly communicate the rod chamber with the pressure tube;

a first piston assembly slidably fitted in the pressure tube for movement along the longitudinal axis, wherein the first piston assembly is coupled to the piston rod and separates the pressure tube into a first working chamber and a second working chamber, the first piston assembly comprising a first valve assembly that controls fluid flow between the first working chamber and the second working chamber;

an auxiliary housing disposed in the pressure tube and coupled to the piston rod proximal to the piston end, such that the first piston assembly is disposed between the rod chamber and the auxiliary housing relative to the longitudinal axis, wherein the auxiliary housing is disposed in fluid communication with the rod chamber, the auxiliary housing comprising a second valve assembly that controls fluid flow between the second working chamber and the rod chamber; and a damper assembly comprising:
a sleeve disposed at least partially within the rod chamber and extending at least between the upper chamber end and the lower chamber end, such that an inner chamber is defined within the sleeve and an annular chamber is defined between the sleeve and the piston rod, the sleeve comprising at least one second opening disposed proximal to the upper chamber end and extending through the sleeve to fluidly communicate the inner chamber with the annular chamber, wherein the at least one second opening is axially spaced apart from the at least one first opening relative to the longitudinal axis; and a floating piston slidably received within the sleeve and separating the inner chamber into an upper inner chamber and a lower inner chamber, such that the at least one second opening fluidly communicates the upper inner chamber with the annular chamber and the lower inner chamber is disposed in fluid communication with the auxiliary housing.

2. The shock absorber of claim 1, wherein the rod chamber defines a chamber length between the upper chamber end and the lower chamber end, and wherein the at least one first opening is axially spaced apart from the at least one second opening by an axial distance along the longitudinal axis, such that the axial distance is at least 70% of the chamber length.

3. The shock absorber of claim 1, wherein the at least one first opening comprises a plurality of first openings angularly spaced apart from each other about the longitudinal axis.

4. The shock absorber of claim 1, wherein the at least one second opening comprises a plurality of second openings angularly spaced apart from each other about the longitudinal axis.

5. The shock absorber of claim 1, wherein a maximum width of the inner chamber is greater than 20% and less than 90% of a maximum width of the rod chamber.

6. The shock absorber of claim 1, wherein the piston rod further comprises a post extending from the piston end and coupled to each of the first piston assembly and the auxiliary housing, the post defining a rod passage extending along the longitudinal axis from the piston end to the lower chamber end and fluidly communicating the auxiliary housing with the rod chamber.

7. The shock absorber of claim 6, wherein the post has a post diameter less than a rod diameter of the piston rod at the lower chamber end.

8. The shock absorber of claim 6, wherein a maximum width of the rod passage is less than a maximum width of the rod chamber.

9. The shock absorber of claim 8, wherein the maximum width of the rod passage is at most 50% of the maximum width of the rod chamber.

10. The shock absorber of claim 6, further comprising a nut coupled to the post and disposed between the first piston assembly and the auxiliary housing relative to the longitudinal axis.

11. The shock absorber of claim 10, further comprising a lower washer disposed between the first piston assembly and the nut relative to the longitudinal axis.

12. The shock absorber of claim 6, wherein the auxiliary housing further comprises an auxiliary chamber fluidly disposed between the rod passage and the second valve assembly.

13. The shock absorber of claim 1, wherein the floating piston has a substantially polygonal cross-section along a plane parallel to the longitudinal axis.

14. The shock absorber of claim 1, wherein the sleeve further comprises an upper tapered section disposed adjacent to the upper chamber end of the rod chamber and configured to at least partially receive the floating piston therein.

15. The shock absorber of claim 14, wherein the at least one second opening is disposed in the upper tapered section.

16. The shock absorber of claim 1, wherein the piston rod further comprises a lower tapered section adjacent to the lower chamber end of the rod chamber and configured to at least partially receive the floating piston therein.

17. The shock absorber of claim 1, wherein the first valve assembly is configured to open at a first threshold pressure difference applied across the first valve assembly, wherein the second valve assembly is configured to open at a second threshold pressure difference applied across the second valve assembly, and wherein the first threshold pressure difference is greater than the second threshold pressure difference.

18. The shock absorber of claim 1, wherein a first maximum width of the first piston assembly is greater than a second maximum width of the auxiliary housing.

19. The shock absorber of claim 1, further comprising an upper washer disposed between the first piston assembly and a shoulder of the piston rod relative to the longitudinal axis.

20. The shock absorber of claim 1, wherein the floating piston is moveable between a retracted position proximal to the upper chamber end and an extended position proximal to the lower chamber end, and wherein the floating piston is configured to move towards the retracted position during a compression stroke of the shock absorber and towards the extended position in a rebound stroke of the shock absorber.

* * * * *